United States Patent [19]

Kawamata et al.

[11] Patent Number: 5,454,451
[45] Date of Patent: Oct. 3, 1995

[54] PROCESS FOR CONTROLLING VIBRATION DAMPING FORCE IN A VIBRATION DAMPING DEVICE

[75] Inventors: Satoru Kawamata, Higashimurayama; Masatoshi Ohishi, Kodaira; Norio Nihei, Kodaira; Takeshi Kimura, Kodaira, all of Japan

[73] Assignee: Bridgestone Corporation, Tokyo, Japan

[21] Appl. No.: 996,646

[22] Filed: Dec. 24, 1992

[30] Foreign Application Priority Data

Dec. 27, 1991 [JP] Japan ................................. 3-346190
Mar. 25, 1992 [JP] Japan ................................. 4-67083

[51] Int. Cl.⁶ ............................. F16F 15/03; F16F 9/49
[52] U.S. Cl. .................. 188/267; 188/280; 188/281; 188/299; 267/140.14
[58] Field of Search .................. 188/267, 280, 188/281, 299; 267/140.14, 140.15

[56] References Cited

U.S. PATENT DOCUMENTS

| | | | |
|---|---|---|---|
| 4,858,733 | 8/1989 | Noguchi et al. | 188/267 |
| 4,893,800 | 1/1990 | Tabata | 188/267 X |
| 4,896,752 | 1/1990 | Shtarkman | 188/267 X |
| 4,913,409 | 4/1990 | Doi et al. | 267/140.14 |
| 4,919,402 | 4/1990 | Doi | 267/140.14 |
| 5,100,166 | 3/1992 | Mitsui | 188/267 X |
| 5,161,653 | 11/1992 | Hare, Sr. | 188/267 |
| 5,236,182 | 8/1993 | Aoki et al. | 267/140.14 |
| 5,249,784 | 10/1993 | Murakami et al. | 188/267 X |

FOREIGN PATENT DOCUMENTS

| | | | |
|---|---|---|---|
| 63-266237 | 11/1988 | Japan . | |
| 199031 | 8/1989 | Japan | 188/267 |
| 2111171 | 6/1983 | United Kingdom . | |

*Primary Examiner*—Robert J. Oberleitner
*Assistant Examiner*—Kevin D. Rutherford
*Attorney, Agent, or Firm*—Sughrue, Mion, Zinn, Macpeak & Seas

[57] ABSTRACT

In order to develop sufficient vibration damping performance and effectively prevent transmission of goading vibrations and others in a vibration damping device using an electrorheological fluid, if the moving directions of vibration input side member and vibration output side member of the device are opposite to each other, a voltage applied to electrodes in the device is increased to increase the viscosity of the electrorheological fluid, while if absolute value of vibration acceleration velocity in the vibration input side member exceeds a given value, a voltage applied to the electrodes is always decreased to decrease the viscosity of the fluid.

4 Claims, 4 Drawing Sheets

*FIG_2*
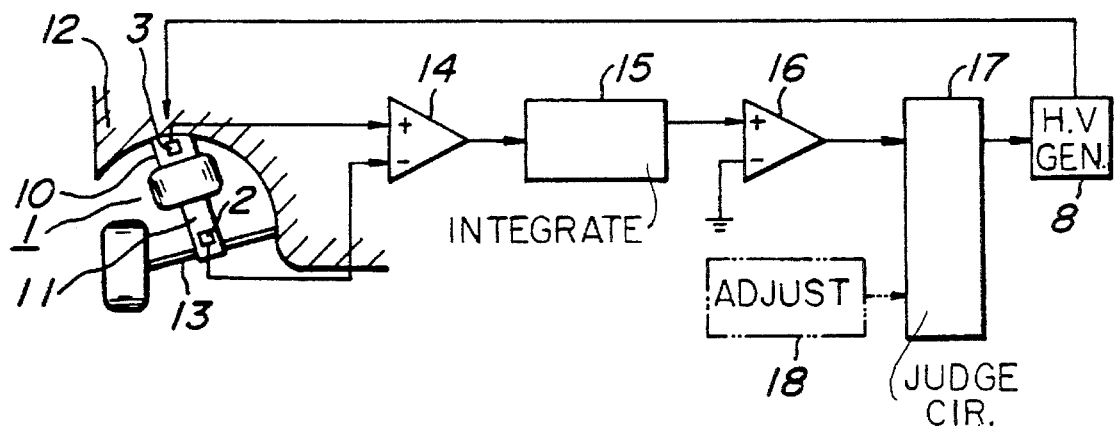
*FIG_3*
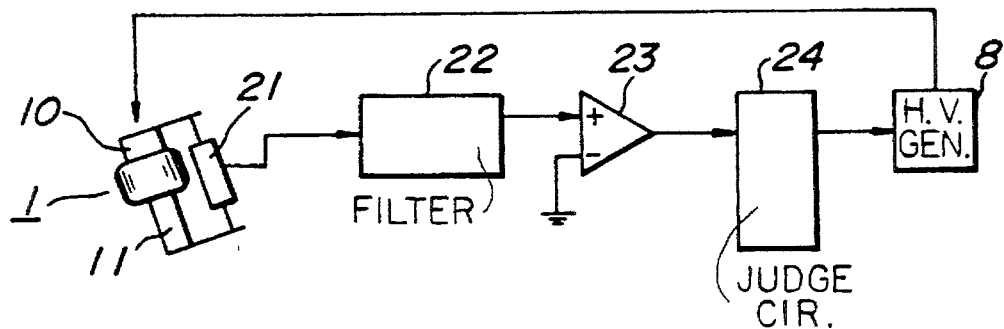

FIG_4
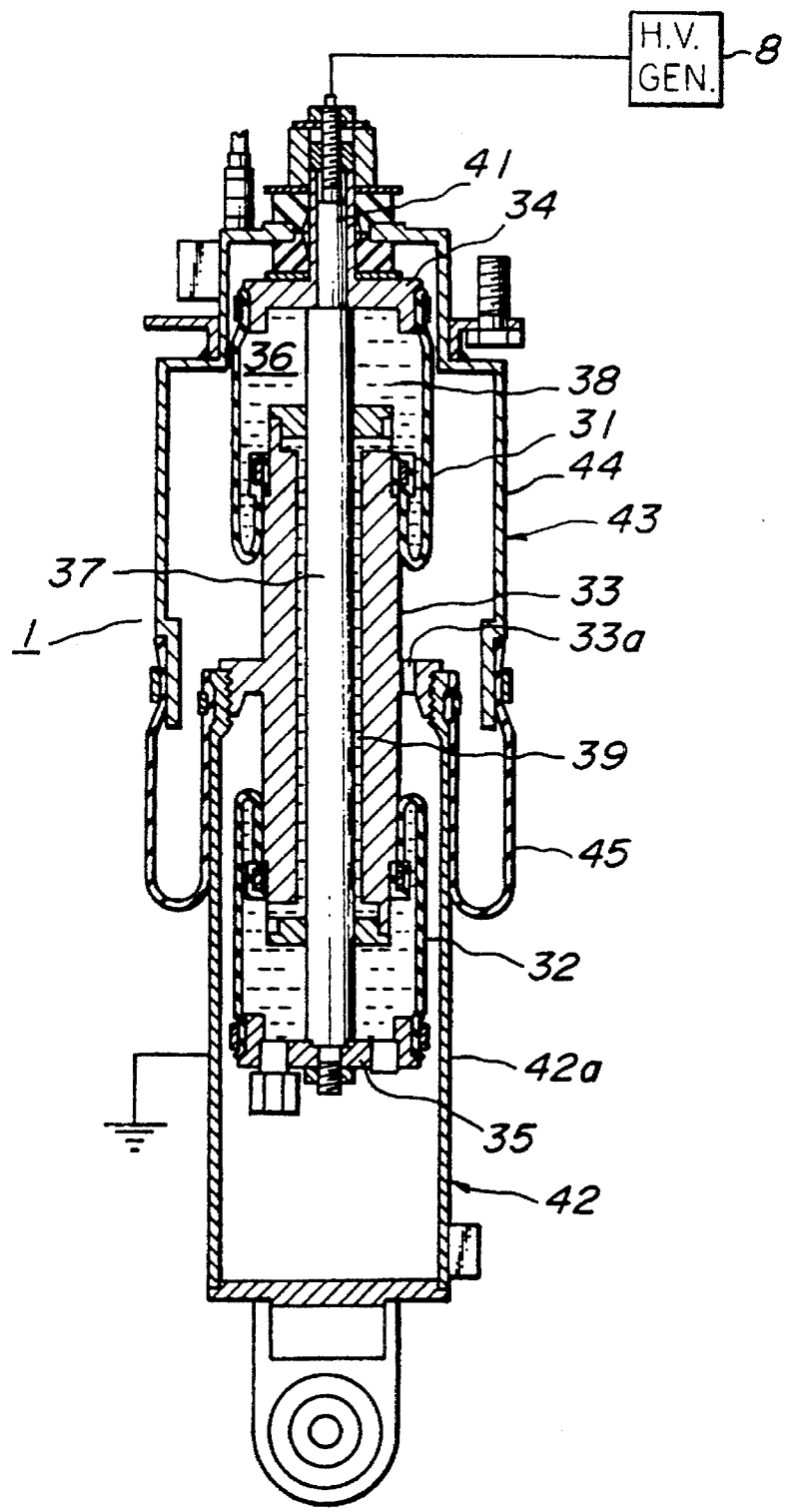

PROCESS FOR CONTROLLING VIBRATION DAMPING FORCE IN A VIBRATION DAMPING DEVICE

BACKGROUND OF THE INVENTION

1. Field of the Invention

This invention relates to a process for controlling vibration damping force in a vibration damping device suitable for use in an automobile suspension system for passenger car, truck and the like, a suspension system for railroad vehicles, a vibration damper for industrial machines, a vibration absorbing device for buildings and the like.

2. Description of the Related Art

For instance, vibration damping devices comprising a closed fluid chamber divided into two parts by a partition member inclusive of a flexible member, an electrorheological fluid filled in the fluid chamber, a restricted passage disposed in the fluid chamber and electrodes arranged in the restricted passage are disclosed in U.S. Pat. No. 4,858,733 and Japanese Patent laid open No. 63-266237. In these vibration damping devices, when a direction of vibrational acceleration in an upper side portion of the device or a vibration output side portion thereof is the same as a direction of relative moving velocity between the vibration output side portion and a lower side portion or a vibration input side portion of the device, a high voltage is applied to the electrodes to increase the viscosity of the electrorheological fluid, whereby the vibration damping force is increased.

In the conventional technique of controlling the vibration damping force based on only the vibrational acceleration, however, when the device is used as an automobile suspension system, if a goading vibration resulted from the riding on protrusions is transmitted to the vibration input side portion of the device at such a state that the vibration damping force of the device becomes large, the device itself transmits a larger vibrating force to the vibration output side portion.

SUMMARY OF THE INVENTION

It is, therefore, an object of the invention to solve the aforementioned problem of the conventional technique and to provide for controlling vibration damping force in a vibration damping device which can effectively prevent the transmission of vibrating force against the input of the goading vibration and other relatively large and vigorous vibration at such a state that the vibration damping force of the device is raised.

According to a first aspect of the invention, there is the provision of a process for controlling vibration damping force by adjusting a voltage applied to electrodes in a vibration damping device comprising a closed fluid chamber divided into two parts by a partition member inclusive of a flexible member, an electrorheological fluid filled in the fluid chamber, a restricted passage disposed in the fluid chamber, electrodes arranged in the restricted passage, a vibration input side member and a vibration output side member. In this method when moving directions of the vibration input side member and vibration output side member are opposite to each other, the voltage applied to the electrodes are increased to increase the viscosity of the electrorheological fluid. When an absolute value of vibration acceleration in the vibration input side member exceeds a given value, the voltage applied to the electrodes is always decreased to lower the viscosity of the electrorheological fluid.

In a preferred embodiment of the first aspect, the application of voltage to the electrodes is stopped when vibrational acceleration is a frequency region sufficiently lower than a resonant frequency of the vibration output side member or sufficiently higher than a resonant frequency of the vibration input side member, or the voltage applied to the electrodes when the device is deformed in an extension direction is higher than the voltage applied to the electrodes when the device is deformed in a compression direction.

According to a second aspect of the invention, there is the provision of an apparatus for controlling vibration damping force in a vibration damping device comprising a closed fluid chamber divided into two parts by a partition member inclusive of a flexible member, an electrorheological fluid filled in the fluid chamber, a restricted passage disposed in the fluid chamber and electrodes arranged in the restricted passage, a vibration input side member and a vibration output side member. The apparatus comprises an acceleration sensor fitted to each of the vibration input side member and vibration output side member, an output judging circuit connected to the vibration acceleration sensor through an integration circuit and a high-voltage generating means signally connected to the output judging circuit for applying a voltage to the electrodes, in which the vibration acceleration sensor for the vibration input side member is separately and directly connected to the output judging circuit.

In a preferred embodiment of the second aspect, the integration circuit for the vibration input side member serves as a filter for stopping an output power against vibration frequency higher than at least specific frequency, and the integration circuit for the vibration output side member serves as a filter for stopping an output power against vibration frequency lower than at least specific frequency.

According to a third aspect of the invention, there is the provision of an apparatus for controlling vibration damping force in a vibration damping device comprising a closed fluid chamber divided into two parts by a partition member inclusive of a flexible member, an electrorheological fluid filled in the fluid chamber, a restricted passage disposed in the fluid chamber and electrodes arranged in the restricted passage, a vibration input side member and a vibration output side member. The apparatus comprises an acceleration sensor fitted to each of the vibration input side member and vibration output side member, an integration circuit connected to the acceleration sensor through a differential amplifier for determining a difference between detected acceleration, an output judging circuit connected to the integration circuit through a comparator for detecting a deformation direction of the vibration damping device and a high-voltage generating means signally connected to the output judging circuit for supplying a voltage to the electrodes.

In a preferable embodiment of the third aspect, the integration circuit serves as a filter for stopping an output power against vibration frequency lower than a specific frequency or vibration frequency higher than other specific frequency.

According to a fourth aspect of the invention, there is the provision of an apparatus for controlling vibration damping force in a vibration damping device comprising a closed fluid chamber divided into two parts by a partition member inclusive of a flexible member, an electrorheological fluid filled in the fluid chamber, a restricted passage disposed in the fluid chamber and electrodes arranged in the restricted passage, a vibration input side member and a vibration output side member. The apparatus comprises a relative acceleration sensor for detecting a relative acceleration between the vibration input side member and the vibration output side member in the device, an output judging circuit connected to the relative acceleration sensor through a comparator for detecting a deformation direction of the device and a high-voltage generating means signally connected to the output judging circuit for supplying a voltage to the electrodes.

In a preferable embodiment of the fourth aspect, a filter for stopping an output power against vibration frequency lower than a specific frequency or vibration frequency higher than other specific frequency is interposed between the relative acceleration sensor and the comparator.

BRIEF DESCRIPTION OF THE DRAWINGS

The invention will be described with reference to the accompanying drawings, wherein:

FIG. 2 is a circuit diagram illustrating a second embodiment of the apparatus according to the invention;

FIG. 3 is a circuit diagram illustrating a third embodiment of the apparatus according to the invention;

FIG. 4 is a longitudinally sectional view of an embodiment of the vibration damping device according to the invention.

DESCRIPTION OF THE PREFERRED EMBODIMENTS

Figure 1:
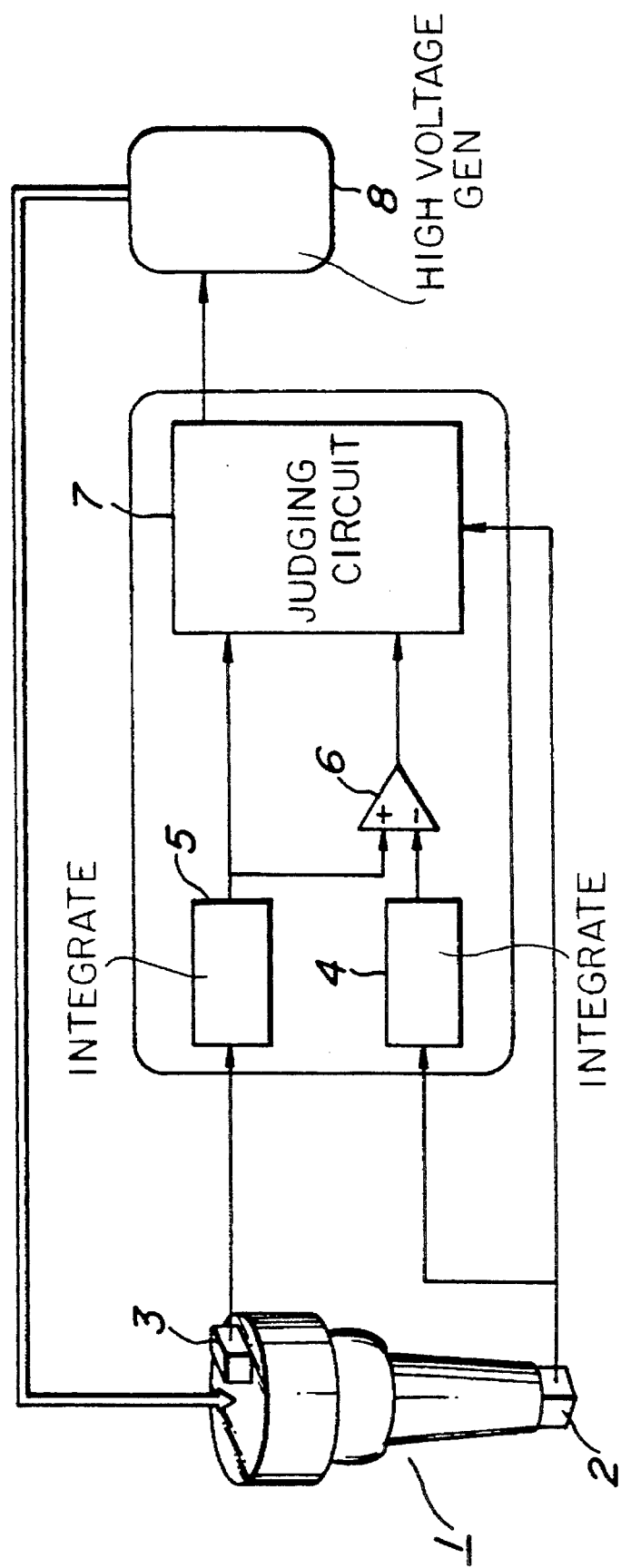
FIG. 1 is a circuit diagram illustrating a first embodiment of the apparatus according to the invention.

In the process for controlling vibration damping force according to the invention, when moving directions of the vibration input side member and vibration output side member are opposite to each other, the voltage applied to the electrodes are increased to increase the viscosity of the electrorheological fluid. As a result the vibration damping force can be increased likewise the conventional technique to effectively damp vibrations.

On the other hand, when the vibration input side member is subjected to a large vibration acceleration exceeding a given value within a range of 1.5 g–3.0 g through goading vibration or others at such a state that the vibration damping force in the device is large, the voltage applied to the electrodes is sufficiently decreased to effectively decrease the vibration damping force irrespective of the situations, whereby the transmission of the goading vibration or others to the vibration output side member can effectively be prevented.

When using the first apparatus according to the invention, it is theoretically effective to control the vibration damping force by determining the moving acceleration of the vibration input side member and the vibration output side member as a signal of integration output of acceleration. However, when an acceleration of low frequency produced by undulations of long wavelength of a road surface or change of road surface from horizontal road toward a slope is output as a signal of integration output, there is a problem that this integration output is saturated and also the vibration control is conducted against low frequency vibration not sensed bodily as a ride comfortability. In any case, when vibrations of frequency higher than a bodily sensed frequency region are applied as a composite input, these vibrations can not be sufficiently damped.

As regards high frequency vibrations, the effect of damping vibrations is improved as the vibration damping force becomes small. Even if vibration damping control is conducted at the high frequency region to be damped, there is a problem that the appropriate improvement of the vibration damping effect can not be attained due to the time lag of the control system, power source, damping system or the like.

For this end, when low frequency vibration and high frequency vibration is extent, not sensed bodily, the voltage applied to the electrodes is stopped to minimize the vibration damping force, whereby the vibration damping ability against bodily sensed frequency region as a composite input and also the vibration damping effect against high frequency vibrations are ensured.

In the apparatus according to the invention, vibration acceleration detected by the acceleration sensors in the vibration input side member and vibration output side member are converted into signals of vibration velocity through the integration circuits, from which velocity vector of the vibration output side member and the relative moving directions of the vibration input side member and vibration output side member are measured. When the moving directions of these members are opposite to each other, a high-voltage generating signal is output from the output judging circuit to the high-voltage generating means. As a result, the voltage applied to the electrodes is increased by the high-voltage generating means to largely increase the vibration damping force of the vibration damping device.

On the contrary, a low-voltage generating signal or a power-stopping signal is output from the output judging circuit to the high-voltage generating means under conditions other than the above opposite moving directions of the vibration input and output side members, whereby the vibration damping force of the device is decreased to a given value.

Further, when the vibration acceleration of the vibration input side member exceeds a given value of, for example, 2.0 g as an output from the acceleration sensor at the vibration input side member directly connected to the output judging circuit, even if the vibration damping force is increased, the low-voltage generating signal or the power-stopping signal is output from the output judging circuit to the high-voltage generating means to effectively prevent the transmission of goading vibration or others to the vibration output side member.

Moreover, the integration circuits act as a filter for stopping output power against a frequency higher or lower than a specific frequency, whereby a power-stopping signal based on the stop of output power is output from the output judging circuit to the high-voltage generating means to stop the application of voltage to the electrodes. Thus, the vibration damping ability against input vibrations of a bodily sensed frequency region as a composite input and the vibration damping effect against high frequency vibrations are sufficiently ensured under a very low vibration damping force.

In the second apparatus according to the invention, the accelerations detected by the acceleration sensors are input to the differential amplifier to determine a relative acceleration, which is integrated in the integration circuit to obtain a relative velocity. Then, the relative velocity is input to the comparator to judge the deformation of the vibration damping device in an extension or compression direction. This judgment is input to the output judging circuit, from which a signal of voltage applied to the electrodes in accordance with the deformation state of the device, i.e. a high-voltage generating signal when the deformation is the extension direction or a low-voltage generating signal when the deformation is the compression direction is output to the high-voltage generating means. Consequently, the high-voltage generating means supplies a given voltage to the electrodes in accordance with the signal from the output judging circuit. Thus, the viscosity of the electrorheological fluid is increased to produce a high vibration damping force in the extension direction of the device, while the viscosity of the electrorheological fluid is decreased to produce a low vibration damping force in the compression direction of the device.

Moreover, when a voltage adjusting means for stepwise or continuously changing the voltage applied from the high-voltage generating means to the electrodes in accordance with the running state of the vehicle or others is arranged in the output judging circuit or at the outside of the output judging circuit in accordance, vibration damping control can be conducted more effectively.

Even in this apparatus, when each of a low frequency vibration and high frequency vibration is extent and not sensed bodily, the voltage applied to the electrodes is stopped to minimize the vibration damping force, whereby the vibration damping ability against bodily sensed frequency region as a composite input and also the vibration damping effect against high frequency vibrations are ensured likewise the aforementioned first apparatus.

In the third apparatus according to the invention, the relative velocity between the vibration input side member and the vibration output side member is directly measured to judge the deformation direction of the vibration damping device, whereby the same vibration damping control as previously mentioned can be conducted without using the integration circuit.

Even in this apparatus, the above control is conducted through a filter for stopping the output power against the high frequency region desiring the low damping force and the low frequency region substantially corresponding to a direct current component produced by slope or the like. Thus vibrations at the bodily sensed frequency region can effectively be reduced and also vibrations at high frequency region, which become a problem in the conventional damper, can be suppressed.

In FIG. 1 is shown a circuit diagram of a first embodiment of the apparatus for controlling vibration damping force according to the invention, wherein numeral 1 is a vibration damping device and numerals 2, 3 acceleration sensors fitted to vibration input side member and vibration output side member of the device 1, respectively.

The acceleration sensors 2, 3 are fitted to the device itself, but may be arranged at fitting sides of the device 1.

These acceleration sensors 2, 3 are connected to respective integration circuits 4, 5 for converting vibration acceleration into vibration velocity. The integration circuits are connected to an output judging circuit 7. Moreover, the signals output from the integration circuits 4, 5 may be input to the output judging circuit 7 through a differential amplifier 6 as shown. Separately, the acceleration sensor 2 is directly connected to the output judging circuit 7.

In this case, the differential amplifier 7 calculates a relative velocity between the moving directions of the vibration input side member and the vibration output side member to input a signal into the output judging circuit 7.

The output judging circuit 7 judges an output signal to a high-voltage generating means 8 based on the above signal of relative velocity and a velocity signal or velocity vector signal of the vibration output side member directly input from the integration circuit 5 to the output judging circuit 7.

The high-voltage generating means 8 functions to apply a given voltage to electrodes (not shown) arranged in the vibration damping device 1.

In FIG. 2 is shown a circuit diagram of a second apparatus according to the invention when the vibration damping device 1 is mounted onto a vehicle.

A fitting member 10 of the device 1 is attached to a vehicle body 12 as a sprung member, while a fitting member 11 of the device 1 is attached to a suspension arm 13 as an unsprung member. An acceleration sensor 2 is fitted to the fitting member 10, while an acceleration sensor 3 is fitted to the fitting member 11. These acceleration sensors 2, 3 are connected to an integration circuit 15 through a differential amplifier 14.

The differential amplifier 14 functions to detect a relative acceleration between the fitting members 10, 11 and hence between the vehicle body 12 and the suspension arm 13 based on signals output from the acceleration sensors 2, 3, while the integration circuit 15 functions to change the relative acceleration velocity into a relative velocity.

The integration circuit 15 is connected to an output judging circuit 17 through a comparator 16. The comparator 16 functions to judge the deformation direction of the vibration damping device 1, i.e. extension or compression direction of the device 1. Based on such a judgment, the output judging circuit 17 outputs a signal for supplying a given high or low voltage to a high-voltage generating means 8 signally connected to the output judging circuit 17.

In the high-voltage generating means 8, when the deformation of the device 1 is an extension direction, a high voltage is applied to the electrodes to increase the vibration damping force of the device 1. When it is a compression direction, a low voltage is applied to the electrodes to decrease the vibration damping force of the device 1.

Moreover, the output judging circuit 17 is connected to an adjusting means 18 shown by phantom line. The values of high or low voltage applied to the electrodes are stepwise or continuously adjusted in accordance with the steering state, acceleration and deceleration states, lateral acceleration velocity of the vehicle body, forward and backward acceleration and the like to provide a more preferable vibration damping force of the device.

According to this apparatus, the vibration damping force can be increased or decreased as desired by adjusting the voltage applied to the electrodes without requiring mechanically movable parts, so that the fluid passage of the vibration damping device and hence the structure of the device itself can be simplified and also the durability of the device can effectively be improved.

Further, when the integration circuit 15 functions as a filter for stopping output signal to the comparator 16 against vibration frequency lower than a specific frequency such as a frequency smaller than ½ of resonant frequency of the sprung member or vibration frequency higher than other specific frequency such as a frequency higher than 2 times of resonant frequency of the unsprung member, the vibration damping force against these lower or higher vibration frequency can sufficiently be reduced based on a signal from the output judging circuit 17 to the high-voltage generating means 8 for stopping the application of voltage or applying a slight voltage to develop the function and effect as mentioned above.

In FIG. 3 is shown a circuit diagram of the third embodiment of the apparatus according to the invention, in which a relative velocity sensor 21 for detecting a relative velocity between the fitting members 10, 11 of the vibration damping device 1 is arranged and connected to a comparator 23 through a filter 22 or without the filter 22 and then the comparator 23 is connected to an output judging circuit 24. The output judging circuit 24 is connected to the same high-voltage generating means 8 as previously mentioned. The high-voltage generating means 8 supplies a voltage to the electrodes of the device 1 in accordance with a signal from the output judging circuit 24.

In this apparatus, the result detected is input from the relative velocity sensor 21 to the comparator 23, at where the deformation direction of the device 1 is judged in the same manner as mentioned above. The judged result is input from the comparator 23 to the output judging circuit 24, from which a signal for supplying a high or low voltage in accordance with the deformation direction of the device is input to the high-voltage generating means 8.

In the device 1, therefore, a large vibration damping force is obtained in the extension deformation and a low vibration damping force is obtained in a compression deformation likewise the aforementioned apparatus.

In the third apparatus, the same adjusting means 18 as shown in FIG. 2 is arranged, whereby the value of voltage applied to the electrodes can stepwise or continuously be changed in accordance with the driving state of the vehicle and others to conduct more preferable vibration damping control.

Further, when the filter 22 is functions to input a signal to the comparator 23 for stopping an output power against a frequency smaller than ½ of resonant frequency of the sprung member or a frequency higher than 2 times of resonant frequency of the unsprung member, the vibration damping effect against high frequency is sufficiently ensured with the sufficient vibration damping force against the bodily sensed frequency region as a composite input.

As the vibration damping device 1, use may be made as described in U.S. Pat. No. 4,858,733, Japanese patent laid open No. 63-266237 and one shown in FIG. 4.

In the vibration damping device 1 sectionally shown in FIG. 4, each of one end portions of two cylindrical flexible membrane members 31, 32 is liquid-tightly connected to each end portion of a cylindrical member 33 constituting a restricted passage as a whole, while the other end portions of the membrane members 31, 32 are liquid-tightly connected to respective face plates 34, 35, whereby a closed fluid chamber 36 is formed to face the folded portions of the membrane members 31, 32 to each other. The face plates 34, 35 are connected to each other through a rigid member 37 passing through the restricted passage constituting member 33 inside the fluid chamber 36.

An electrorheological fluid 38 is filled in the fluid chamber 36, in which the interiors of the membrane members 31, 32 and a restricted passage 39 defined by the restricted passage constituting member 33 and the rigid member 37 over an approximately full length of the member 33 and having a given laterally sectional area are filled with the electrorheological fluid 38. Further, fitting members 41, 42 are attached to the face plate 34 and the restricted passage constituting member 33, respectively, whereby the device 1 may be mounted onto given places.

In the device 1, the rigid member 37 forms a positive electrode connected to the high-voltage generating means 8, while the restricted passage constituting member 33 and hence the fitting member 42 fixed thereto form a negative electrode connected to earth.

In use, the vibration damping device 1 is used alone or may be used in combination with other spring means such as coil spring or air spring 43 shown in FIG. 4.

The air spring 43 is constructed by attaching an outer cylinder 44 to the outside of the face plate 34, functioning a cup-shaped member 42a of the fitting member 42 as an inner cylinder, airtightly connecting end portions of a flexible sleeve 45 to the outer cylinder 44 and the cup-shaped member 42a and piercing plural through-holes 33a in an outward flange of the restricted passage constituting member 33 for communicating interiors of the cup-shaped member 42a and the outer cylinder 44 with each other.

In the invention, the acceleration sensor 2 shown in FIG. 1 is fixed to a vibration input side member of the vibration damping device 1 or the fitting member 42 shown in FIG. 4. As shown in FIG. 1, when the acceleration sensor 2 is directly connected to the output judging circuit 7 without passing through the integration circuit 4 and the differential amplifier 6, if the absolute value of the vibration acceleration detected by the acceleration sensor 2 exceeds a given value, a signal for applying a low voltage to the electrodes or stopping the application of voltage is output from the output judging circuit 7 to the high-voltage generating means 8.

The operation of the apparatus shown in FIG. 1 will be described below.

The vibration acceleration detected by the acceleration sensors 2, 3 are converted into vibration velocities by the integration circuits 4, 5. An output signal from the integration circuit 5 is directly input to the output judging circuit 7, while output signals from the integration circuits 4, 5 are input to the differential amplifier 6 to determine a relative velocity, which is then input to the output judging circuit 7.

Figure 5:
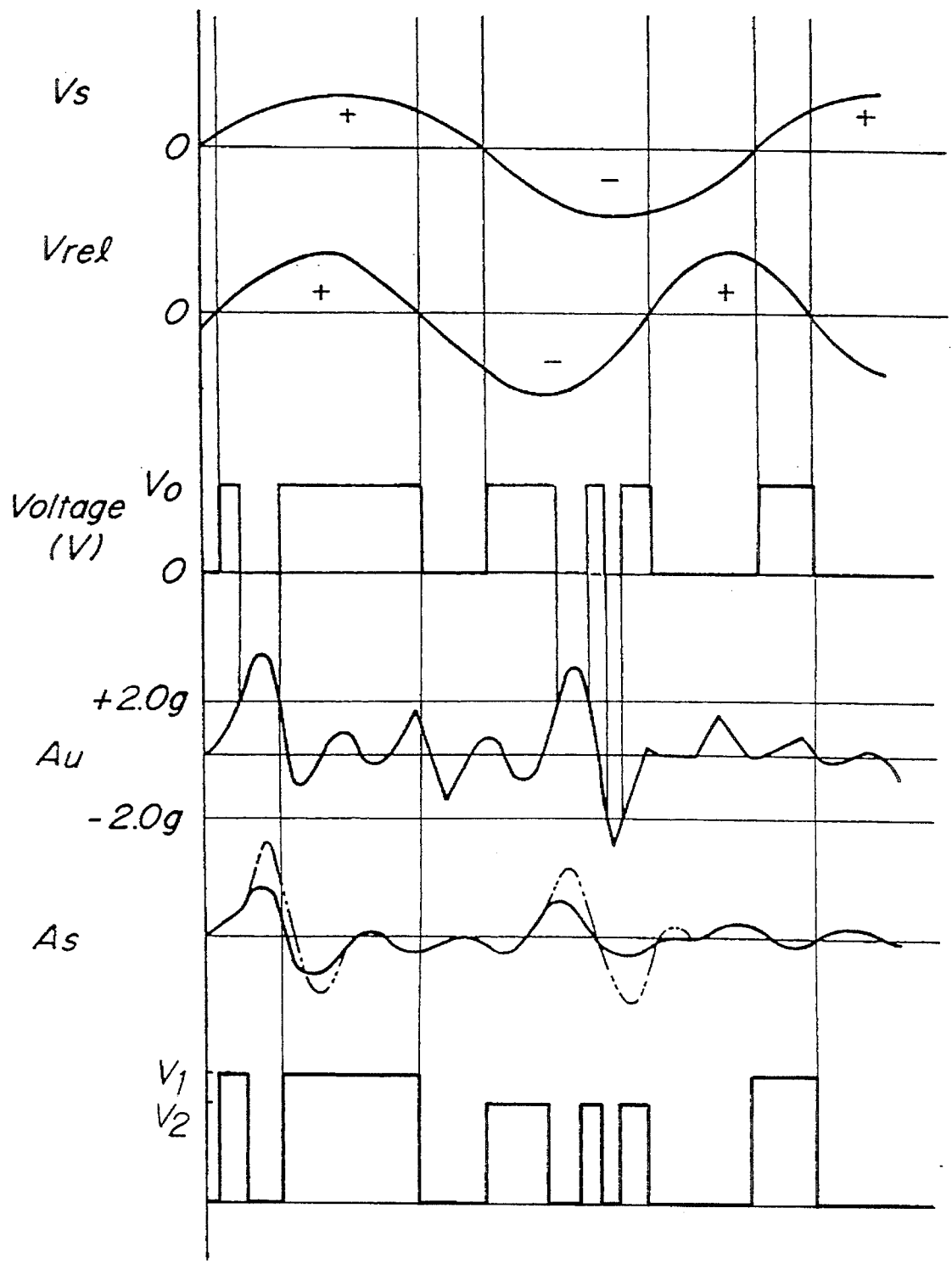
FIG. 5 is a diagrammatic view showing a state of controlling a voltage applied to electrodes.

When the vibration velocity output from the integration circuit 5 or vibration velocity of the vibration input side member changes according to a curve $V_s$ shown in FIG. 5 provided that a velocity of upward direction is positive, if a relative velocity obtained by subtracting the vibration velocity output from the integration circuit 4 from the vibration velocity Vs changes according to a curve $V_{rel}$ shown in FIG. 5, the output judging circuit 7 gives a signal of a given high voltage to the high-voltage generating means 8 in case that the vibration velocity $V_s$ is positive and the relative velocity $V_{rel}$ is positive or the vibration output side member has a velocity of upward direction and the vibration input side member and the vibration output side member are moved in a direction of separating away from each other, and in case that the vibration velocity $V_s$ is negative and the relative velocity $V_{rel}$ is negative or the vibration output side member has a velocity of downward direction and both the members are moved in a direction of approaching to each other, respectively. This is shown by a pulse of voltage in FIG. 5, in which a given high voltage applied to the electrodes is $V_0$ V when the above conditions are satisfied and a given low voltage applied to the electrodes is 0 V when the conditions are not satisfied.

And also, the output judging circuit 7 determines a vibration acceleration of the vibration input side member directly input from the acceleration sensor 2. When such a vibration acceleration is a curve $A_u$ shown in FIG. 5, if the absolute value of the vibration acceleration exceeds, for example, 2.0 g, the output judging circuit 7 outputs a signal of a given low voltage inclusive of 0 V to the high-voltage generating means 8 even if high voltage is applied to the electrodes. This is shown by broken lines in the voltage pulse of FIG. 5. In case that the vibration acceleration $A_u$ is a region exceeding 2.0 g, even when high voltage is applied to the electrodes, such a voltage is immediately reduced to 0 V to effectively decrease the viscosity of the electrorheological fluid. Thus the transmission of goading vibration or others to the vibration output side member can effectively be prevented. That is, if the portion of broken lines or the portion of low voltage application is not existent in the voltage pulse, the vibration acceleration of the vibration output side member changes as shown by phantom line of a curve $A_s$ in FIG. 5. Consequently vibrations of the vibration input side member are directly transmitted to the vibration output side member, but the presence of the broken line portion can sufficiently prevent the transmission of vibrations to the vibration output side member as seen from solid line portion in FIG. 5.

Further, when the integration circuit 4 for the vibration input side member functions as a filter for reducing output power against a frequency region (not lower than 45 Hz) sufficiently higher than a resonant frequency (10–15 Hz) of vibration input system and the integration circuit 5 functions as a filter for cutting output power against a frequency region (not higher than 0.5 Hz) sufficiently lower than a resonant frequency (1.0–1.5 Hz) of vibration output system, if signals are not input from the integration circuits 4, 5 to the output judging circuit 7, a signal for stopping the application of voltage is input from the output judging circuit 7 to the high-voltage generating means 8. Thus the absorption of high frequency vibration can be attained and also the vibration damping effect of bodily sensed frequency region (about 2–8 Hz) as a composite input can be developed.

In the vibration damping device 1 as shown in FIG. 4, the voltage applied from the high-voltage generating means 8 and hence the voltage between the electrodes is increased to increase the viscosity of the electrorheological fluid 36. As a result the flowing resistance of the fluid 36 through the restricted passage 39 is increased to produce a large vibration damping forcer while the voltage between the electrodes is decreased to gradually decrease the vibration damping force and when the applied voltage is zero, the vibration damping force becomes minimum.

Moreover, when the vibration damping device 1 of FIG. 4 is applied to the vibration damping control apparatus shown in FIG. 2, the expected vibration damping force can be obtained without using mechanical operating parts. The similar result is obtained when the device 1 is applied to the apparatus of FIG. 3.

In the apparatus according to the invention, a stress detecting sensor for acting stress to the rigid member 37 shown in FIG. 4 may be used instead of the acceleration sensor or relative velocity sensor.

As mentioned above, according to the invention, stationary vibrations can be effectively reduced by sufficiently increasing the vibration damping force of the vibration damping device, while the transmission of vibrations can effectively be prevented by decreasing the vibration damping force against goading vibrations and other violent vibrations.

Further, when the integration circuits function as a filter to cut off vibrations of frequency region sufficiently higher than resonant frequency of vibration input system or vibrations of frequency region sufficiently lower than resonant frequency of vibration output system, not only the vibration damping effect against high frequency vibration can sufficiently be enhanced, but also the bodily sensed vibrations as a composite input can effectively be reduced.

What is claimed is:

1. A process for controlling vibration damping force by adjusting a voltage applied to electrodes in a vibration damping device comprising a closed fluid chamber divided into two parts by a partition member inclusive of a flexible member, an electrorheological fluid in the fluid chamber, a restricted passage disposed in the fluid chamber, electrodes arranged in the restricted passage, a vibration input side member and a vibration output side member, which method comprises the steps of:

detecting vibration accelerations of the vibration input side member and the vibration output side member by vibration acceleration sensors arranged respectively on each of the vibration input side member and the vibration output side member in the device;

converting the detected vibration accelerations into signals of vibration velocity by integration circuits arranged in the device to measure relative moving directions of the vibration input side member and the vibration output side member;

increasing the voltage applied to the electrodes to increase the viscosity of the electrorheological fluid only when the vibration input side member and the vibration output side member are moved in a direction to separate away from each other during the upward moving of the vibration output side member, or only when the vibration input side member and the vibration output side member are moved in a direction approaching to each other during the downward moving of the vibration output side member; and decreasing the voltage applied to the electrodes to lower the viscosity of the electrorheological fluid when a means for determining an absolute value of vibration acceleration in the vibration input side member determines that the absolute value of vibration acceleration exceeds a given value.

2. The process according to claim 1 further comprising the step of; stopping the application of voltage to the electrodes when vibrational acceleration is in a frequency region sufficiently lower than a resonant frequency of the vibration output side member or sufficiently higher than a resonant frequency of the vibration input side member.

3. The process according to claim 1, wherein the voltage applied to the electrode when the device is deformed in an extension direction is higher than the voltage applied to the electrodes when the device is deformed in a compression direction.

4. The process according to claim 2, wherein the voltage applied to the electrode when the device is deformed in an extension direction is higher than the voltage applied to the electrodes when the device is deformed in a compression direction.

* * * * *